Jan. 1, 1924
H. D. WILSON
BATTERY ELECTRODE
Filed March 20, 1923
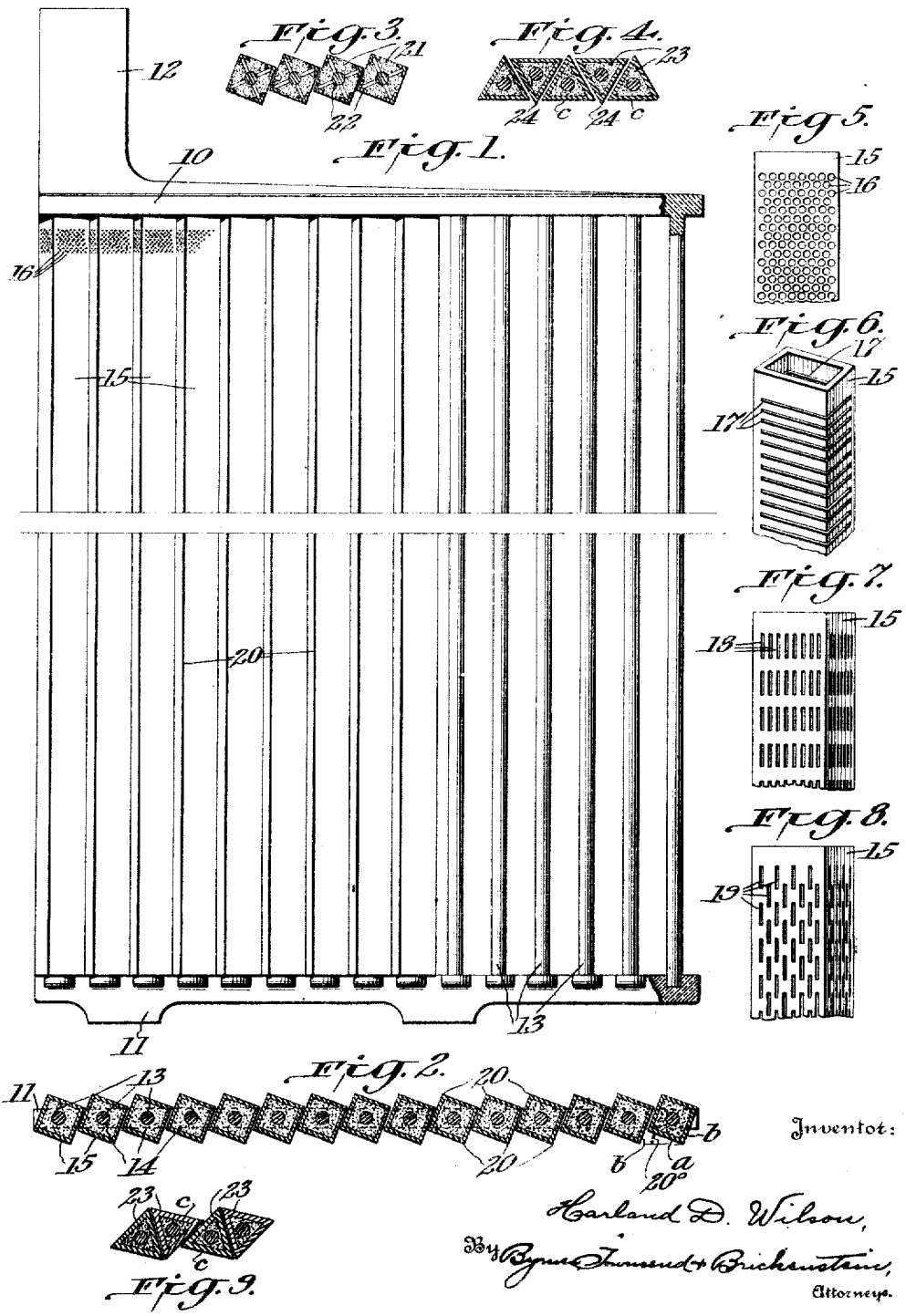

Patented Jan. 1, 1924.

1,479,527

UNITED STATES PATENT OFFICE.

HARLAND D. WILSON, OF INDIANAPOLIS, INDIANA, ASSIGNOR TO THE PREST-O-LITE CO., INC., OF INDIANAPOLIS, INDIANA, A CORPORATION OF NEW YORK.

BATTERY ELECTRODE.

Application filed March 20, 1923. Serial No. 626,387.

*To all whom it may concern:*

Be it known that I, HARLAND D. WILSON, a citizen of the United States, residing at Indianapolis, in the county of Marion and State of Indiana, have invented certain new and useful Improvements in Battery Electrodes, of which the following is a specification.

This invention relates to battery electrodes and particularly to the type in which a number of separate units or elements are assembled on a suitable support to form an electrode for use in storage batteries.

In electrodes of this type, the separate units or elements may comprise small grid sections having the active material supported on a skeleton framework or the elements may take the form of perforated containers within which the active material is held. In either case, the support for the active material may be of conducting material or it may be formed of insulating material if a suitable conducting core or strip is provided. When assembled to form an electrode the conducting strips or portions of the several elements are joined to a bar which forms the terminal of the electrode. Various forms of this type of electrode have been suggested from time to time since the early days of the storage battery art, but the proposed constructions have been more or less unsatisfactory on account of the low volume efficiency or the small surface per unit weight of active material accessible to the electrolyte.

An object of this invention is to provide an electrode of the type stated which will be free from the objection noted. A further object of the invention is to provide an electrode of the type stated in which the several elements are so arranged that the electrode will have a maximum volume of active material consistent with the acid space necessary for the class of service for which the battery is designed.

In the accompanying drawings,

Fig. 1 is an elevation of an electrode having elements which comprise perforated tubes enclosing the active material and conducting cores, certain of the tubes being omitted however to more clearly illustrate the conducting core construction;

Fig. 2 is a horizontal section through the electrode;

Fig. 3 is a fragmentary horizontal section through an electrode having pasted grid elements;

Fig. 4 is a fragmentary horizontal section showing an arrangement of triangular tube elements in an electrode;

Fig. 5 is an elevation on a larger scale of a portion of a tubular retainer having circular perforations;

Figs. 6, 7, and 8 are perspective views illustrating other forms of porous retaining tubes; and Fig. 9 is a fragmentary horizontal section illustrating another arrangement of triangular elements in an electrode.

The supporting frame upon which the separate elements are assembled may take various forms and as shown in Figs. 1 and 2, the supporting frame comprises an upper bar 10 of conducting material, for example antimonial lead, and a lower bar 11 which also may be formed of conducting material. The upper bar 10 carries an integral terminal extension 12 and a plurality of depending rods 13 which serve as conducting cores for the masses of active material 14 which are retained in the tubes 15. The tubes 15 are preferably of insulating material such as hard rubber and are provided with a great number of openings of such small size as to retain the active material while permitting free access of the electrolyte to the active material. As shown in Figs. 1 and 5, the perforations may comprise circular openings 16 or they may comprise narrow slots or other shaped openings, if desired. By way of example, a tube having horizontal slots 17 which extend across two adjacent faces of the tube is shown in Fig. 6, while aligned rows of vertical slots 18 are shown in Fig. 7, and staggered rows of vertical slots 19 are shown in Fig. 8. The shape and arrangement of the perforations may be varied at will so long as sufficient porosity is attained without employing perforations of such size that the active material may escape from the tube.

As shown in Figs. 1 and 2, the perforated tubes 15 which form the outer surfaces of the elements are substantially square in cross section and the elements are angularly arranged on the supporting bars to bring the outer faces *a* of the elements at a substantial angle to the plane of the assembled electrode. The side faces *b* of the elements are overlapped as viewed from the face of the electrode but are spaced apart to provide narrow channels for the circulation of the electrolyte. This positioning of the elements causes oppositely disposed edges of the elements to project outwardly and form parallel spacing ribs 20 at the opposite faces of the electrode. The upper bar 10 may be of such width as to extend to the spacing ribs 20 but the lower bar 11 is preferably of lesser width. When the electrode is assembled in a battery, separators contact with the spacing ribs 20 and define acid spaces.

The angle at which the outer faces of the elements are arranged with respect to the central plane of the electrode or the plane defined by the edges 20 is determined by the nature of the service for which the battery is designed. For service requiring a high discharge rate the angle between the outer faces $a$ and the plane of the electrode may be approximately 20° and should not substantially exceed 30 or 35°. For a given thickness of electrode a greater acid space could be provided by making this angle greater than 20°, but such arrangements are not ordinarily desirable since the total volume of active material in the element decreases rapidly after the critical angle of approximately 20° is passed. When the nature of the service for which the electrode is intended does not necessitate a high discharge rate the angle may be reduced, thus providing less acid space and more active material for a given thickness of electrode. In all practical arrangements of rectangular elements it will be found that these are not symmetrical to the central plane of the electrode, i. e., the outer faces $a$ lie at an angle of substantially less than 45° to the central plane, while the side faces $b$ which meet the faces $a$ at the edges 20 lie at an angle of substantially more than 45° to the central plane of the electrode.

It will be apparent that the invention is not limited to electrodes in which elements of the perforated tube type are assembled in the manner described, since the same angular arrangements may be employed with elements which comprise masses of active material 21 supported on conducting grids or frames 22. The separate elements are substantially square in cross-section and they may be assembled on suitable frames with their outer faces disposed at a predetermined angle to the plane of the electrode.

While elements of square cross-section are to be preferred, other polygonal sections may be employed if desired. As shown in Fig. 4, triangular electrodes 23 may be compactly arranged with their respective edges 24 projecting beyond the outer faces $c$ of the two adjacent elements to provide spacing ribs. With this arrangement, the outer faces $c$ of the elements may be parallel to the central plane of the electrode and set back from the ribs 24 at any desired distance to provide the required ratio of acid space to volume of active material. The triangular elements may be angularly arranged as shown in Fig. 9 and, as in the case of the square elements, the angle between the outer face $c$ of the elements and the plane of the electrode will be determined by the discharge rate for which the electrode is designed. For any given rate of discharge a particular angular arrangement of elements of polygonal cross-section will provide the maximum amount of active material consistent with the acid space necessary for the given discharge rate and will also provide spacing ribs against which separators may rest.

It will be understood that the invention is not limited to electrodes formed of elements of the specific shapes and arrangements herein described, since elements of different polygonal cross-section may be used to give any desired ratio of exposed surface to volume of active material, and the arrangement of the elements may be varied to secure the most efficient relation between the volume of active material and the acid required, for any class of service.

I claim:

1. A battery electrode comprising supporting means and a plurality of elements of polygonal cross-section, each of said elements having two adjacent faces which lie at different angles to the central plane of the electrode and which meet in an edge which provides a rib at the face of the electrode.

2. A battery electrode comprising supporting means and a plurality of elements of substantially rectangular cross-section arranged with their outer faces at an angle to the central plane of the electrode, said angle being substantially less than 45°.

3. A battery electrode comprising supporting means and a plurality of elements of substantially rectangular cross-section arranged with their outer faces at an angle of approximately 20° to the central plane of the electrode.

4. A battery electrode comprising supporting means and a plurality of elements having the cross-section of a polygon of less than five sides, said elements being arranged with their adjacent faces overlapped and with edges of the elements providing ribs at the opposite faces of said electrode.

5. A battery electrode comprising supporting means and a plurality of elements of substantially rectangular cross-section arranged with their outer faces at an angle to the plane of the electrode of substantially less than 45° and with adjacent faces partially overlapped.

6. A battery electrode comprising supporting means and a plurality of elements of substantially square cross-section arranged with their outer faces at an angle to the plane of the electrode and with their side faces overlapped.

7. A battery electrode comprising supporting means and a plurality of elements of substantially square cross-section arranged with their side faces overlapped and their outer faces at an angle to the central plane of the electrode, said angle being substantially less than 45°.

8. A battery electrode comprising supporting means and a plurality of elements of substantially square cross-section arranged with their side faces overlapped and their outer faces at an angle of approximately 20° to the central plane of the electrode.

9. A battery electrode comprising supporting means and a plurality of elements of substantially square cross-section arranged with their outer faces at an angle of approximately 20° to the plane of the electrode, each of said elements comprising a conducting core, active material or material adapted to be rendered active, and a permeable retainer.

10. A battery electrode comprising supporting means and a plurality of triangular elements, each of said elements being arranged with its base substantially parallel to the central plane of the electrode and with its apex located between and projecting beyond the bases of the adjacent elements.

In testimony whereof, I affix my signature.

HARLAND D. WILSON.